Patented May 9, 1944

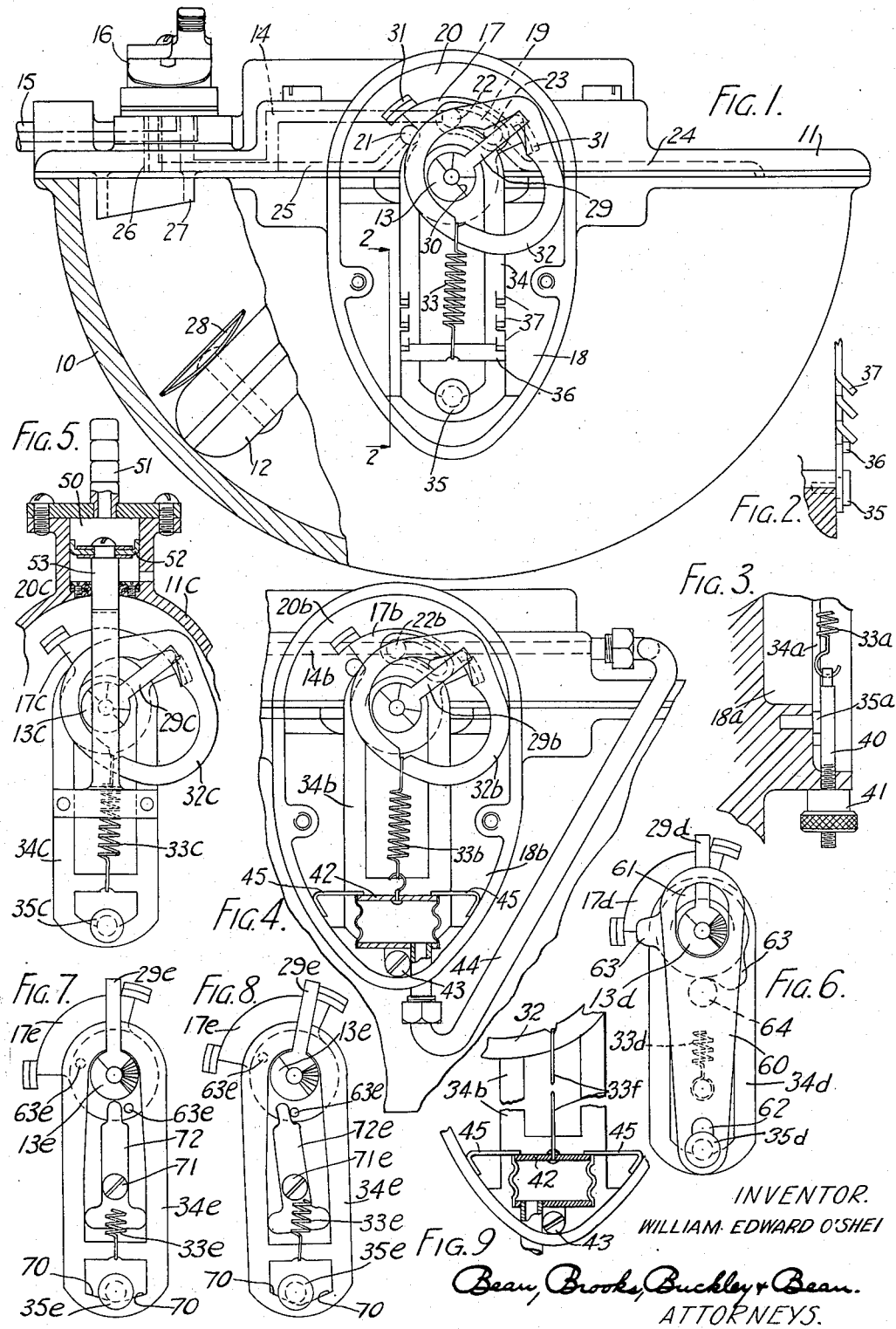
May 9, 1944. W. E. O'SHEI 2,348,492
SNAP-ACTION VALVE MECHANISM
Filed May 27, 1943
INVENTOR.
WILLIAM EDWARD O'SHEI
Bean, Brooks, Buckley & Bean
ATTORNEYS.

2,348,492

UNITED STATES PATENT OFFICE 2,348,492

SNAP-ACTION VALVE MECHANISM

William Edward O'Shei, London, England

Application May 27, 1943, Serial No. 488,690
In Great Britain April 21, 1942

12 Claims. (Cl. 121—97)

The present invention relates to valve controlling means for controlling valves which operate with a snap action or over-centre action, such as are used in motors operated with differential fluid pressures.

In motors operated with differential fluid pressures, such as are used for operating windscreen wipers, snap-action valve means are usually provided for controlling and reversing the application of differential fluid pressures to the opposite sides of the piston, paddle or equivalent actuating means of such motors, for operating the motor. The valve of such valve means is customarily actuated from the driving shaft of the motor through actuating means including a lost motion connection and a spring, so that when the valve actuating means passes beyond its dead centre position, the spring rapidly pulls the valve actuating means to its opposite limiting position simultaneously moving the valve with a snap-over action.

Both with suction and fluid pressure types of motors, the pressure with which the valve bears against the valve seating is dependent upon the degree of suction or pressure of the operating fluid applied to the motor. Thus, when a higher degree of suction or pressure is used the friction between the valve and the valve seating increases, which necessitates the employment of a more powerful spring for snapping over the valve. For this reason, in the commercial manufacture of such motors, the spring is made sufficiently powerful to operate the valve mechanism when the maximum differential pressure which is anticipated will be experienced is applied to the motor. This, however, gives rise to greater wear on the valve parts than is necessary since it is seldom that the motor is operated with the maximum differential fluid pressure for which it is designed and, furthermore, gives rise to noise since the valve snaps over and hits against its limiting abutments with greater force when the motor is operating at a differential fluid pressure lower than the maximum for which it is designed.

Further, when the differential fluid pressure applied is considerably below that for which the motor is designed, the motor is liable to stop operating due to its possessing insufficient power to overcome the load imposed by the spring, and on the other hand if for any reason the differential fluid pressure should exceed that for which the motor is designed, there is a risk of the motor failing to operate under load conditions, due to the friction between the valve and the valve seating being sufficient to prevent the spring from pulling the valve over. The latter drawback is experienced particularly with motors operated by compressed air which, when used on a vehicle, may be operated from the compressed air supply which is also used for actuating the vehicle brakes and of which in consequence the pressure varies over an extremely wide range. It has thus been found difficult to construct a compressed air operated motor which will operate successfully over the wide range of pressures experienced under such conditions.

Among the objects of the present invention are to provide improved snap-over valve mechanisms which will overcome or avoid the above discussed defects of prior types; to provide fluid pressure motors which will operate in a more efficient and silent manner over a wider range of operating fluid pressures than has hitherto been possible; to provide means in snap-over valve mechanisms for overcoming or counteracting the effects of friction between the valve and its seating under pressure of fluid passing through the valve; and to provide constructions of snap-over valve mechanism of the character described and of fluid pressure motors which will be straightforward and economical to manufacture and efficient in operation.

The invention contemplates, inter alia, the provision of means in a snap-action valve mechanism for controlling the actuating force exerted by the valve actuating means to snap-over the valve, whereby such force may be adjusted to suit the degree of suction or pressure of the fluid applied to the valve. The invention also contemplates controlling the force exerted to snap-over the valve, by means correlated to the pressure of fluid on the valve.

A feature of the invention resides in the provision of means operable manually or automatically and affording adjustment or control of the magnitude or incidence of the snap-over force exerted by a snap-action valve mechanism.

Illustratively, the invention will now be further explained with reference to the accompanying drawing, but it is to be understood that this disclosure is by way of example only and that the invention is not to be considered as limited otherwise than as defined in the appended claims.

In the drawing,

Fig. 1 is a side view, partly in section and with the cover of the valve chamber removed, of a suction-operated motor incorporating an embodiment of the invention;

Fig. 2 is a fragmentary section taken on the line 2—2 of Fig. 1;

Fig. 3 is a fragmentary sectional view of a modification;

Fig. 4 is a fragmentary side view of a suction-operated motor similar to that of Fig. 1 but incorporating another embodiment of the invention;

Fig. 5 is a fragmentary view partly in section of a modification of the embodiment of Fig. 4 for application to a pressure-type motor;

Fig. 6 is a side view showing a snap-action valve mechanism according to a further embodiment;

Fig. 7 is a view similar to Fig. 6 of another modification;

Fig. 8 is a view of the modification of Fig. 7 in another position; and

Fig. 9 is a view illustrating a still further modification.

In the several figures of the drawing, corresponding parts are identified by similar reference numerals, with suffixes to distinguish such parts in the different embodiments.

The motor illustrated in Fig. 1 is, in its main details, a suction-operated windscreen wiper motor of a type commonly in use, and comprises a casing 10 fitted with a cover 11 forming a sealed piston chamber in which a piston 12 of the paddle or vane type mounted on a rocker shaft 13 is adapted to oscillate in an arcuate manner about the axis of the shaft, angularly oscillating the latter. The vane divides the piston chamber in air-tight manner into two compartments. The cover 11 is provided with a passage 14 which is adapted to be put into communication with the suction supply conduit 15 through the manual control valve 16 when the latter is in the "running" position. The passage 14 leads to automatic valve mechanism for connecting the source of suction to opposite sides of the vane in order to reciprocate it, the valve mechanism also controlling the admission of atmospheric air to the side of the vane not for the time being under suction. The valve mechanism is made automatic in action under control of the swinging movement of the vane so that the valve mechanism is automatically reversed each time the vane reaches the limit of its swing in either direction. The automatic valve mechanism may comprise an oscillatory valve 17 of segmental form mounted for movement upon and about the axis of the portion of the shaft 13 within a valve chamber 18 at one side of the casing 10. The valve 17 has an arcuate channel 19 therein and is movable arcuately between two positions by means of a snap-action mechanism operated by the movement of the shaft 13, the valve 17 operating against a valve seating 20 on the cover 11, the seating having three valve ports 21, 22 and 23 disposed arcuately therein so as to cooperate with the channel 19 in the valve 17. The valve 17 always covers the middle port 22 and is operated so as also to cover the ports 21 and 23 alternately in the two positions of the valve and thereby effect communication of the ports 21 and 23 alternately with the port 22 by way of the channel 19 in the valve. The ports 21 and 23 are each open to atmospheric air in the valve chamber 18 when not covered by the valve. The port 22 leads into the passage 14, the port 23 leads into the passage 24 which communicates directly with the piston chamber at the right hand side of the vane as viewed in Fig. 1, whilst the port 21 leads into the passage 25 which when the control valve 16 is in the "running" position can communicate through ports in the control valve with a passage 26 which leads to the piston chamber at the left hand, or "parking" side of the vane, the passage 26 opening at its lower end into a cup 27 in the piston chamber. The cup 27 is adapted to be closed by a closure 28 on the vane 12 when the latter is moved into its "parked" position by the control valve 16 being moved to its "parking" position which causes the supply of suction to be cut off from the passage 14 and applied directly through the passage 26 to the "parking" side of the vane 12.

The snap-action mechanism for operating the valve 17 may be of the construction shown, consisting of a kicker 29 which is pivoted to the shaft 13 at the axis of the latter and is engageable by faces 30 of a recess in the end of the shaft. The kicker is engageable with ears 31 on the valve 17 to shift the latter between its two operative positions, and the outer end of the kicker is engaged by a frame 32 which is anchored by a spring 33 to a pressure plate 34 which is mounted over the shaft 13 and a post 35 extending from the adjacent face of the casing 10, the pressure plate bearing against the outer face of the valve 17.

It will be seen that when the shaft 13 turns angularly counter-clockwise as viewed in Fig. 1, the right shoulder 30 will engage and move kicker 29 until the outer end thereof passes beyond its dead-centre position on the dead-centre line extending through the centre of post 35 and the centre of shaft 13, whereupon the spring 33 will snap the kicker counter-clockwise against the left ear 31 of the valve 17 and thus move the latter to its left limit position. Movement of the shaft in the opposite direction, clockwise, will cause the parts to operate in the reverse manner snapping the valve to the position shown in Fig. 1.

Whereas the pressure plate 34 merely holds the valve 17 in sliding engagement with its seating 20, the pressure with which the valve bears against its seating, and hence the friction between these parts, and in turn the force required to operate the valve, are mainly dependent upon the degree of suction applied to the valve through the passage 14 and port 22. A means for variation or adjustment of the force or pressure exerted to snap-over the valve is therefore provided and such means may be of a character effective to vary the tension of the spring 33. Such an adjustment means may be of the simple form shown in Fig. 1 for manual operation to provide adjustment to any of a plurality of pre-set positions corresponding to different operating conditions. The adjusting means shown consists of a bar 36 to which the lower end of the spring 33 is anchored, which bar may be latched and held by the tension of the spring 33 under any selected pair of a set of pairs of lugs, projections or the like latch elements 37 struck up or otherwise formed or provided on the pressure plate 34. By such means, the bar 36 may be pre-set to any desired one of the positions provided by the pairs of elements 37 to adjust the spring tension to suit different operating fluid pressures.

In a modification, instead of providing a set of pre-arranged positions of adjustment, the manual adjusting means may be of a form providing for infinite adjustment within the range of adjustment provided, as exemplified by Fig. 3 in which the lower end of the spring 33a of the snap-over mechanism is shown anchored to the upper end of a spindle 40 which passes through a hole in the wall at the bottom of the valve chamber 18a and carries on its projecting screwed end a knurled nut 41. The tension of the spring 33a maintains the nut 41 in engagement with the outside surface of the valve chamber wall and prevents the nut from becoming loose. The spindle 40 maintains the pressure plate 34a in position over the stud 35a. It will be seen that the tension of the spring 33a is capable of adjustment as may be desired, by manipulation of the nut 41.

Manual adjustment means of the character disclosed are useful for pre-setting the motor to suit particular working pressure conditions under which the motor is intended to be used, and enable motors of identical construction to be manufactured for a range of different operating pressure supplies, the motors being adapted as required by the simple manual adjustment provided, to suit a given pressure supply.

Preferably, however, and in accordance with a feature of the invention, adjustment of the force exerted by the snap-over mechanism is made automatic in order to compensate for variations in pressure conditions occurring while the motor is working. For this purpose, means may be provided of a character effective to correlate adjustment of the snap-over mechanism with the fluid pressure obtaining at the valve, and may take the form of a pressure responsive device, as, for instance, a device including a piston, diaphragm or expanding bellows, which is responsive to the aforesaid fluid pressure under control therefrom regulates the actuating force derived by the snap-over mechanism from its spring.

Thus, as shown in Fig. 4, in a suction-operated motor having a snap-over mechanism operating to reverse the valve 17b in the manner previously described herein and including a kicker 29b, frame 32b, spring 33b and pressure plate 34b, the lower end of the spring 33b is anchored to the top end plate of an expanding bellows 42 which is mounted in the valve chamber 18b by a screw stud 43 which fixes the bottom end plate of the bellows. The interior of the bellows has communication with the source of operating suction through a conduit 44 which may conveniently, as shown, be connected to an extension of the passage 14b leading from the suction supply conduit of the motor to the valve port 22b. Coacting with the bellows is a suitable stop 45 to limit the expansion of the bellows and provide an upper limit position for the top end of the bellows, in which position the bellows is held when the minimum, i. e., normal, spring tension is applied by the spring 33b to the kicker 29b. When the motor is operating, in the event that the suction applied from the source to the valve 17b through the port 22b increases above a normal value the increased suction being simultaneously applied to the bellows 42 through the conduit 44 will cause the bellows to contract correspondingly, the resultant downward movement of its top end plate thereby increasing the tension of the spring 33b to counteract the increased friction between the valve 17b and its seating 20b produced by the increased pull of the valve thereon by the suction through port 22b.

In a development of an arrangement such as described, the spring may be dispensed with and the actuating force for snapping over the kicker may be derived entirely from the bellows or equivalent device which is responsive to the operating fluid pressure applied to the motor. In such an arrangement (depicted in Fig. 9) the spring would be replaced by a link 33f operatively connecting the bellows 42 with the frame 32 which engages the kicker.

In analogous manner to that described with reference to Fig. 4, pressure responsive adjusting means may be applied to motors of the pressure type operated by compressed air or other fluid. Fig. 5 illustrates one such embodiment applied to a motor which may be of a construction as disclosed in my application Serial No. 481,843 filed April 5, 1943, and having an automatic valve mechanism comprising an oscillatory valve 17c and snap-action actuating means including a kicker 29c, frame 32c, spring 33c and pressure plate 34c, normally operating to reverse the valve in a manner analogous to that generally described in the foregoing. The cover 11c of the motor casing is formed above the valve seating 20c with an auxiliary piston chamber 50 which has a supply conduit 51 for connection to the source of compressed air or other fluid used for operating the motor. Within the chamber 50 is a piston 52 having a piston rod 53 connecting it to the pressure plate 34c. The bottom end of the spring 33c attached to frame 32c has a fixed anchorage on the pressure plate, and the upper end of the latter embraces the motor shaft 13c with a clearance, as shown, which allows of vertical downward movement of the pressure plate from its normal position shown in Fig. 5 wherein the spring 33c exerts its minimum (normal) tension upon the kicker 29e, the fixed post 35c over which the lower end of the pressure plate 34c is mounted acting consequentially as an upper limit stop for the piston 52. It will be seen that upon increase of pressure of the operating fluid supplied to the motor, which is likewise applied through the conduit 51 to the chamber 50, the piston 52 therein and the pressure plate 34c attached to the piston will be caused to move downwards and thus cause the tension of the spring to be increased correspondingly.

In the further embodiment illustrated in Fig. 6, a control of the force exerted by the snap-over mechanism to snap-over the valve is effected automatically by the mechanical operation of the motor. To this end, the lower end of the spring 33d of the snap-over mechanism is anchored to a slotted plate 60 which is mounted, like the pressure plate 34d of the snap-over mechanism, over the motor shaft 13d and the fixed post 35d. The upper slot 61 and lower slot 62 in the plate 60, which respectively receive the shaft 13d and post 35d, are elongated to allow displacement of the plate 60 up and down. The shaft 13d is provided with a pair of camming elements of any suitable form such as pins or cam projections 63 as shown, and the plate 60 is provided with a pin or like projection 64 disposed in the path of the cam elements 63 which are arranged to engage the pin 64 when the shaft 13d approaches the limit of its travel in either direction of oscillation. The spring 33d normally exerts a relatively low force which is sufficient to snap-over the valve 17d when the motor and valve are operating under a normal operating fluid pressure.

The mechanism is shown in Fig. 6 in the dead-centre position, with the shaft 13d rotating in a clockwise direction as viewed in the figure, and the kicker 29d of the mechanism rotated by the shaft 13d being about to snap-over the valve 17d clockwise to its other operative position which would cause reversal of rotation of shaft 13d. If, however, an increase in the operating fluid pressure should cause the valve by increased friction to stick on its seating and thereby prevent the kicker 29d from snapping-over, the shaft 13d will continue to rotate clockwise, carrying the kicker 29d and valve 17d with it until the right cam element 63 by engaging pin 64 on the plate 60 shifts the latter downwardly to increase the tension of the spring 33d sufficiently to snap-over the valve, whereupon the consequent reversal of rotation of the shaft 13d will allow the plate 60 to return to its normal position as shown, under the spring tension.

It will be understood that automatic adjustment of the spring tension will take place similarly, through the left cam element 63 coming into play, in the event of the shaft overrunning its normal counter-clockwise rotation due to failure of reversal of the valve from its right limit position.

In a modification of the arrangement of Fig. 6, the continued movement of the motor shaft, upon failure of the valve to snap-over when the snap-over mechanism has passed its centre position, may be utilised to cause the angle of incidence at which the spring tension is applied to the snap-over mechanism to be increased, instead of or additionally to increasing the tension of the spring. This may be achieved by a mechanism as shown in Figs. 7 and 8 in which the spring 33e of the snap-over mechanism is anchored at its lower end to the pressure plate 34e mounted over the motor shaft 13e and fixed post 35e. The lower end of the pressure plate 34e in engagement with the post 35e is formed with a pair of oppositely inclined ramp surfaces 70 the junction or apex of which, cooperating with the post 35e, provides a neutral locating position for the lower end of the pressure plate, as shown in Fig. 7. Pivotally mounted on a fixed stud 71 extending from the motor casing is a lever 72, the lower arm of which is in engagement on both sides with the pressure plate 34e while its upper arm is arranged to lie in the path of a pair of cam elements, such as the pins 63e with which the motor shaft 13e is provided.

The mechanism is shown in Fig. 7 in its normal dead-centre position, with the shaft 13e rotating in a clockwise direction as viewed in the figure, and the kicker 29e of the mechanism being about to snap over the valve 17e. Under normal operation, immediately upon the kicker 29e being rotated by the shaft 13e just beyond its dead-centre position shown in Fig. 7, the valve 17e would be snapped over causing the direction of rotation of shaft 13e to be reversed. If, however, the valve sticks on its seating so that the force exerted by the spring 33e is insufficient to snap the valve over, the shaft 13e will continue its clockwise rotation causing the right pin 63e carried thereby to pivot the lever 72 counter-clockwise which, in turn, will shift the pressure plate 34e transversely in relation to the post 35e causing the post relatively to ride up the left ramp 70 as shown in Fig. 8. This results in the point of anchorage of the spring 33 to the pressure plate 34e being shifted to the right in Fig. 7 from the normal dead centre line passing through the centre of post 35e and the centre of the shaft 13e; thus, the incident angle at which the tension of spring 33e is applied to the kicker 29e will be increased which will effectively increase the spring pull on the kicker 29e until sufficient to snap-over the valve, whereupon the consequent reversal of rotation of shaft 13e will allow the lever 72 and pressure plate 34e to be restored to their normal, neutral, position shown in Fig. 7 by the action of the spring tension assisted by the left ramp 70.

As will be clear from a consideration of Figs. 7 and 8, the mechanism will operate in a similar but reverse manner, with the left pin 63e and right ramp 70 coming into play, should the valve fail to snap-over at the normal timing during the counter-clockwise rotation of the shaft.

It will be seen that in this particular embodiment last described, in addition to the lower end of the spring 33e being shifted transversely for the purpose of increasing its effective power as described, the provision of the ramp surfaces 70 also has the effect of the ramp surfaces 70 causing the displacement of the pressure plate 34e by the lever 72 to have a downward component as well as a transverse component, thereby increasing the tension of the spring. As will be understood, the upper end of the pressure plate 34e will embrace the shaft 13e with clearance sufficient to allow the ramps 70 to be operative.

It will be apparent that the foregoing disclosure of specific embodiments selected for illustration, provides, in simple manner and with simple means, for achieving the objects of the invention, whereby fluid pressure motors may be readily constructed which operate in a more efficient and silent manner over a wider range of operating fluid pressures than hitherto. It will also be apparent, however, to those skilled in the art that other constructions and modifications to the same end are possible, and further that although the invention is particularly applicable to, and has been disclosed with especial reference to, valve mechanisms for differential fluid pressure motors, whether operated by suction or compressed fluid, the invention has application of more general scope wherever snap-over valve mechanisms are employed in which friction between a valve and its seating depends upon the pressure of the fluid passing through the valve.

I claim:

1. In combination, a valve seating having ports therein, means for applying fluid pressure to said ports, a valve movable upon said seating between a plurality of positions for controlling the flow of fluid through said ports, actuating means for moving said valve from one of its said positions to another and including a movable actuating member, a kicker coupling said valve to said actuating member with lost motion and movable by the latter back and forth across an over-center point, and means connected at one end to said kicker and anchored at its opposite end for imparting an over-center snap-action to said kicker and in turn to said valve upon actuation of said kicker by said actuating member, said imparting means including pressure responsive means operable under control of fluid pressure applied to said ports for adjusting said actuating means to control the effective power thereof applied to said valve.

2. In combination, a valve seating having ports therein, means for applying fluid pressure to said ports, a valve movable upon said seating between a plurality of positions for controlling the flow of fluid through said ports, actuating means for moving said valve from one of its said positions to another with a snap-over action, and pressure responsive means operable under control of fluid pressure applied to said ports for adjusting said actuating means to control the effective power thereof applied to said valve.

3. In combination, a valve seating and a valve movable thereon between a plurality of positions, actuating means including a spring-loaded lost-motion connection with said valve for moving the same from one of its said positions to another with a snap-over action, and means for adjusting the spring loading of said actuating means to vary the angle of incidence at which the spring force is applied to said actuating means.

4. In combination, a valve seating and a valve movable thereon between a plurality of positions, actuating means including a spring-loaded dead-centre device for moving said valve from one of its said positions to another with a snap-over action, and means, operable contingent upon said device passing its normal dead-centre position without snapping over the valve, to shift the normal dead-centre line of said device in a direction assisting the snap-over action of said actuating means, whereby to overcome friction between said valve and its seating.

5. In combination, a valve seating and a valve slidable thereon between a plurality of positions, a movable actuating member for said valve, a kicker coupling said actuating member to said valve with lost motion, a tension spring having loading connection at one end with said kicker and attached at the other end to an anchorage so as to impart an over-centre snap-action to said kicker and in turn to said valve upon actuation of said kicker by said actuating member, said anchorage being movable but having a normal neutral position defining a normal dead-centre position for the kicker, and means adapted under control by said actuating member for shifting said anchorage from its said neutral position, said means last mentioned being operative only upon failure of said kicker to snap-over the valve after passing its normal dead-centre position of alignment with the spring and anchorage in said neutral position, and said means when operative being effective to shift said anchorage in a direction to increase the angle of application of the spring tension to the kicker so as thereby to snap-over the kicker and valve, said means being adapted to restore said anchorage to its said normal position upon the next following actuating movement of said actuating member.

6. In combination, a valve seating and a valve slidable thereon between a plurality of positions, a movable actuating member for said valve, a kicker coupling said actuating member to said valve with lost motion, a tension spring having loading connection at one end with said kicker and attached at the other end to an anchorage so as to impart an over-centre snap-action to said kicker and in turn to said valve upon actuation of said kicker by said actuating member, and means to assist the snap-over actuation of the kicker and valve, said means being operative by movement of the actuating member past a position thereof at which the kicker actuated thereby should normally have snapped over and being effective only upon failure of the kicker to so operate.

7. A snap-action valve mechanism for fluid motors, comprising a seating having fluid ports connected to a source of variable operating pressure, a valve movable back and forth on the seating between two positions for operatively connecting the ports and adapted to be urged more firmly on the seating in response to an increased pressure, actuating means for moving the valve from one of its said positions to another with an over-center action, means being provided for automatically adjusting the valve actuating means to adjust the effective force exerted by the actuating means to move the valve beyond its dead-center position, to overcome any increased friction between the valve and its seating which might otherwise prevent the over-center movement of the valve.

8. In a fluid motor, a source of motor operating fluid, a snap-action valve mechanism for fluid motors, comprising a seating having fluid ports, a valve on the seating movable back and forth between two positions for operatively connecting the ports, spring means supported for back and forth movement and operatively connected to the valve, actuating means operable to shift the spring means back and forth across a point of maximum spring distortion for so moving the valve, and means deriving power from said source operable automatically to adjust the effective force exerted by the spring means for overcoming any tendency of the valve to resist its intended movement.

9. In combination, a valve seating having ports therein, means for applying fluid pressure to said ports, a valve movable upon said seating between a plurality of positions for controlling the flow of fluid through said ports, actuating means including a device having a lost-motion connection with said valve and a tension spring loading said device for moving the valve from one of its said positions to another with a snap-over action, a movable anchorage for said spring, and pressure responsive means operable under control of the fluid pressure applied to said ports to vary the position of said anchorage for controlling the actuating force derived from said spring by said actuating means in accordance with the magnitude of the applied fluid pressure.

10. In combination, a valve seating having ports therein, means for applying fluid pressure to said ports, a valve movable upon said seating between a plurality of positions for controlling the flow of fluid through said ports, actuating means for moving said valve from one of its said positions to another and including a movable actuating member, a kicker coupling said valve to said actuating member with lost motion and movable by the latter back and forth across an over-center point, a tension spring connected at one end to the kicker and movable across a point of maximum distention for thereafter moving the kicker independently of the actuating member to so move the valve, and a fluid motor operatively connected to the opposite end of the spring and responsive to the fluid pressure applied to the ports for increasing the tension thereof to more effectively insure such moving of the kicker.

11. In a fluid-operated motor having a reciprocable piston operatively connected with a rocker shaft for angularly oscillating said shaft, and automatic valve mechanism which is operable to applied differential fluid pressures to the opposite sides of the piston for operating the motor, said valve mechanism comprising a valve seating having ports therein and a valve slidable upon said seating for controlling the flow of differential fluid pressures through said ports, actuating means driven by said shaft for moving the valve from one of its said positions to another with a snap-over action for reversing the application of the differential fluid pressures to said piston and thereby reversing the direction of oscillation of said shaft, and means operable by the movement of said shaft for adjusting the effective force applied by said actuating means to snap-over the valve, said means being effective only upon movement of said shaft beyond a position at which it should normally be reversed.

12. In combination, a valve seating having ports therein, means for applying fluid pressure to said ports, a valve movable upon said seating between a plurality of positions for controlling the flow of fluid through said ports, actuating means for moving said valve from one of its said positions to another and including a movable actuating member, a kicker coupling said valve to said actuating member with lost motion and movable by the latter back and forth across an over-center point, a tension spring connected at one end to the kicker and movable across a point of maximum distention for thereafter moving the kicker independently of the actuating member to so move the valve, and means connected to the opposite end of the spring and operable automatically for increasing the effectiveness of the spring for so functioning.

WILLIAM EDWARD O'SHEI.